United States Patent
Kouhia

(10) Patent No.: US 9,181,068 B2
(45) Date of Patent: Nov. 10, 2015

(54) SYSTEM FOR DETERMINATION OF A CONTAINER'S POSITION IN A VEHICLE AND/OR ITS TRAILER TO BE LOADED WITH CONTAINERS

(75) Inventor: Jyrki Kouhia, Julkujärvi (FI)

(73) Assignee: CARGOTEC FINLAND OY, Tampere (FI)

( * ) Notice: Subject to any disclaimer, the term of this patent is extended or adjusted under 35 U.S.C. 154(b) by 84 days.

(21) Appl. No.: 14/117,316

(22) PCT Filed: Apr. 2, 2012

(86) PCT No.: PCT/FI2012/050331
§ 371 (c)(1),
(2), (4) Date: Jan. 22, 2015

(87) PCT Pub. No.: WO2012/152984
PCT Pub. Date: Nov. 15, 2012

(65) Prior Publication Data
US 2015/0191333 A1    Jul. 9, 2015

(30) Foreign Application Priority Data
May 10, 2011 (FI) .................................. 20110159

(51) Int. Cl.
  *B66C 13/46*   (2006.01)
  *G01B 11/00*   (2006.01)
  *G01B 11/14*   (2006.01)
  *G01S 17/42*   (2006.01)

(52) U.S. Cl.
  CPC ............... *B66C 13/46* (2013.01); *G01B 11/14* (2013.01); *G01S 17/42* (2013.01)

(58) Field of Classification Search
  USPC ............... 356/614, 139.1; 340/901, 971, 928, 340/673, 988
  See application file for complete search history.

(56) References Cited

U.S. PATENT DOCUMENTS

| | | | | |
|---|---|---|---|---|
| 5,819,962 A * | 10/1998 | Okubo et al. | ................. | 212/275 |
| 6,135,301 A * | 10/2000 | Monzen et al. | ............... | 212/275 |
| 6,351,720 B1 * | 2/2002 | Hoshina et al. | ............... | 702/154 |
| 6,571,172 B1 * | 5/2003 | Klement | ....................... | 701/514 |
| 8,451,139 B2 * | 5/2013 | Morselli et al. | ............... | 340/901 |
| 2004/0125985 A1 * | 7/2004 | Heidenback et al. | ......... | 382/104 |
| 2005/0281644 A1 * | 12/2005 | Lussen et al. | ................. | 414/403 |
| 2013/0147640 A1 * | 6/2013 | Stocker | ........................ | 340/928 |
| 2014/0285330 A1 * | 9/2014 | Kouhia | ...................... | 340/425.5 |

\* cited by examiner

*Primary Examiner* — Sang Nguyen
(74) *Attorney, Agent, or Firm* — Venable LLP; Eric J. Franklin

(57) ABSTRACT

A system for determining a position of a vehicle and/or in a trailer. The at least one container is loaded and unloaded into the vehicle and/or trailer by a crane. The crane includes a container spreader for gripping the containers and a positioning system for the crane and container spreader. The vehicle and trailer have locking pins that lock into pin holes in the corners of the container. A laser scanner determines the position of the locking pins in the vehicle and/or the trailer and the position of the container depending on the position of the locking pins. The laser scanner is arranged to determine positions in relation to the ground of the locking pins. The position information is relayed to the crane. Based on the position information, the positioning system calculates the position of the locking pins in relation to the crane.

5 Claims, 4 Drawing Sheets

SYSTEM FOR DETERMINATION OF A CONTAINER'S POSITION IN A VEHICLE AND/OR ITS TRAILER TO BE LOADED WITH CONTAINERS

CROSS-REFERENCE TO RELATED APPLICATIONS

This application claims priority to Finnish patent application 20110159 filed 10 May 2011 and is the national phase of PCT/FI2012/050331 filed 2 Apr. 2012.

BRANCH OF TECHNOLOGY

The invention relates to loading of containers into vehicles for use in road transportation, especially into trailer lorries intended for container transportation, and to unloading of containers from these. In greater detail, the invention concerns a system for determination of the container's position in the vehicle to be loaded with containers and/or in its trailer in the container loading area, such as a container freight terminal, where the container or containers are loaded into the vehicle and/or its trailer and are correspondingly unloaded from it/them by a container crane handling the containers and moving in the loading area above the traffic lane or traffic lanes equipped with a container spreader gripping the containers from above and with a positioning system for the container crane and the container spreader, whereby the vehicle and thus also its trailer are equipped with lock pins locking into pin holes in the corners of the container, whereby the system has laser scanners for determining the position of the lock pins in the vehicle and/or its trailer and thus for determining the container's position depending on the pins.

TECHNICAL BACKGROUND

The loading and unloading of road trailer lorries transporting containers is an important part of the operations in almost all container freight terminals. As an operation, the unloading of trailer lorries hardly differs at all from a situation in which the container is picked up in a container depot area, because in both cases the empty container spreader is lowered on to the top of the container, whereupon the container is locked to the spreader with the aid of locking pins.

In automatic container crane systems the container can be lifted automatically from the lorry, for example, with the aid of measuring systems based on laser scanners. However, in most terminals the unloading of containers is a manual operation due to safety provisions.

The loading of trailer lorries is a much more challenging task than unloading. In the trailer of road lorries transporting containers there are usually locking pins making sure that the container will remain in its position during the transportation. Lowering the container with sufficient accuracy, so that the pin holes of the lowered container will come together with the locking pins with sufficient accuracy, is an operation demanding precision. The crane operator's range of visibility is restricted by the container hanging from the container spreader and preventing the operator from seeing the locking pins in the lorry in the late stage of lowering.

Various systems are used to make handling of trailers easier. For example, there are systems where with the aid of a measuring system based on a laser scanner the lorry driver is helped to stop in relation to the crane, so that there is no need to run the primary motions of the crane. Primary motions are those moving the entire portal or lift bogie.

Of prior art solutions representing the laser scanner technology the CN201161875Y printed patent specification is taken as an example, which presents a system for determination of the positions in relation to the crane of the container crane's container spreader and of the trailer lorry to be loaded or unloaded and especially of the locking pins on its platform (or of the container's locking holes). From the information produced by the laser scanners used in the system the type of the lorry to be loaded and/or the type of the container to be lifted off the lorry is also concluded.

A second example of solutions using laser scanner technology is presented in the CN1884034A printed patent specification, which concerns a system for determination of the positions in relation to the crane of a trailer lorry to be loaded or unloaded by a container crane and of containers located on its platform. From the information produced by the laser scanners used in the system the type of the lorry to be loaded and/or the type of the container to be lifted off the lorry is also concluded.

As a third example of solutions representing this technology the JP2005239343A printed patent specification is presented, which concerns a system for determination of the positions of trailer lorries to be loaded or unloaded in relation to the crane handling the containers. The system uses laser scanners located in the crane body.

The container can be lifted automatically from the trailer lorry, for example, with the aid of measuring systems based on laser scanners.

There are also systems based on cameras, which with the aid of computer vision aim at identifying the place of the container determined by locking pins in the trailer. One such solution is presented in the DE3606363A1 printed patent specification, which concerns a system for determination of the position of a trailer lorry to be loaded or unloaded in relation to a crane handling the containers. The system uses cameras located in the crane body at the level of the trailer lorry's platform. The problem with camera-based computer vision systems is their modest reliability due to environmental conditions. Changing lighting, in particular, will cause wrong interpretations. Reliability is very important when controlling the crane's container spreader on the basis of information from the measuring system. Material damages can be caused by false measuring information.

As one more example of the state of the art reference is made to the EP1337454A1 printed patent specification, which presents a system for determination of the position of a trailer lorry to be loaded or unloaded in relation to a crane handling the containers. The system uses sensors located in the crane body at the level of the trailer lorry's platform.

SUMMARY OF THE INVENTION

The present invention aims at providing a new kind of solution for determination of the container's position in a vehicle to be loaded with containers and/or in its trailer. To achieve this aim the invention is mainly characterized in that a laser scanner/laser scanners are installed in the loading area into a fixed structure and are arranged to determine the positions in relation to the ground of locking pins in a vehicle parked in the loading area and/or in its trailer, and in that the system is arranged to relay the position information determined by the laser scanner to a crane, whereby the crane's positioning system based on the crane's and container spreader's position information is adapted to calculate the position of the locking pins in relation to the crane.

The laser scanner/laser scanners are preferably installed beside a traffic lane/traffic lanes.

According to one embodiment of the invention, there is a separate laser scanner for each traffic lane, so that the laser scanner in question is arranged to determine the positions of locking pins in a vehicle parked in the traffic lane and/or in its trailer. Alternatively, one laser scanner is arranged to determine the positions of locking pins in 1-4 vehicles parked in the traffic lane and/or in their trailers.

For loading each vehicle and/or its trailer with a container/containers, at least two locking pins are turned to be in sight in the vehicle and/or its trailer for each container to be loaded.

The invention provides significant advantages over the state of the art. In the system according to the invention, the container's position on the lorry's platform is determined by determining the position of locking pins on the platform with the aid of a laser scanner. Owing to this, the reliability of the system is considerably better compared, for example, with camera-based systems. Besides a higher reliability, the accuracy of the system is also better than in solutions of the prior art.

Other advantages and characteristic features of the invention will emerge from the following description in greater detail of the invention, in which the invention is explained by referring to figures in the appended drawing, to the details of which the invention is not exclusively restricted.

DESCRIPTION IN DETAIL OF ADVANTAGEOUS EMBODIMENTS

Figure 1:
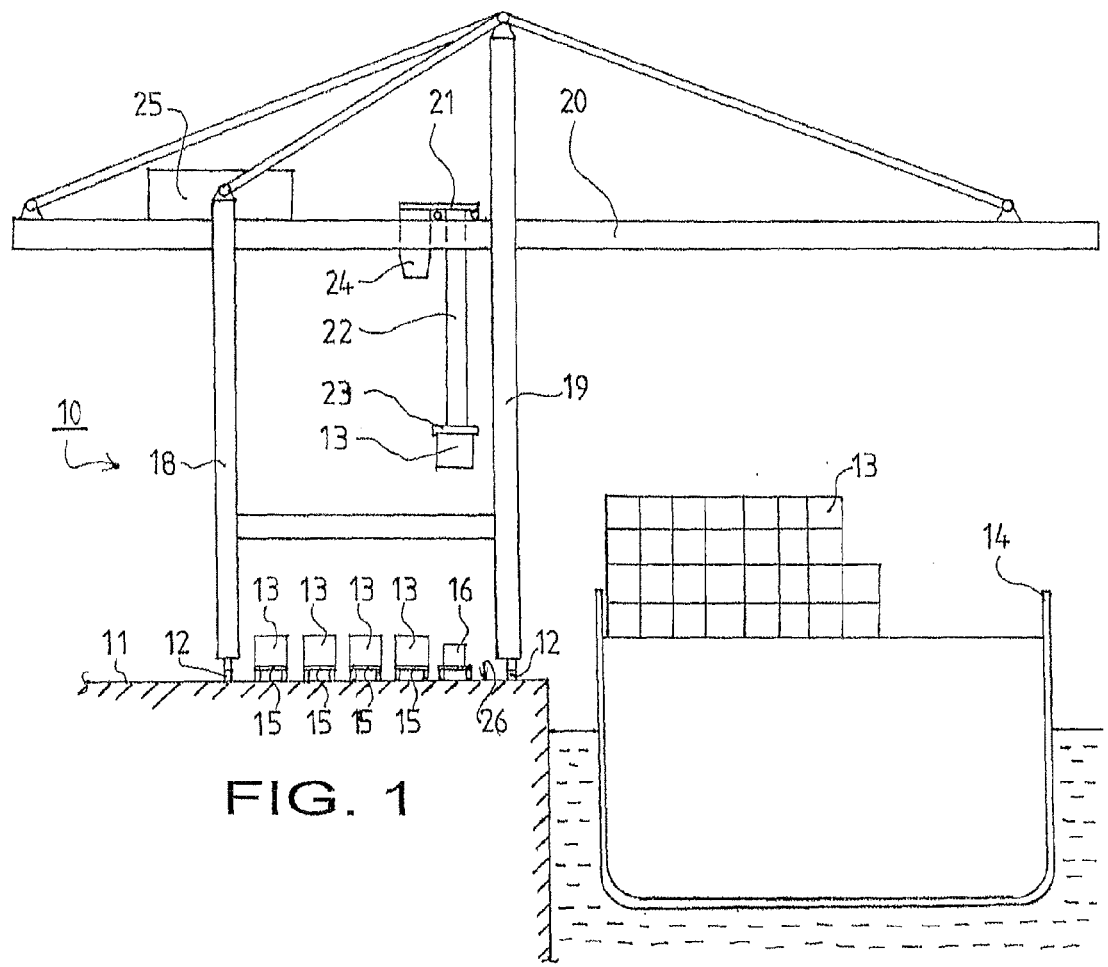
FIG. 1 is a schematic view of a container crane, which is used in a port and in which the system according to the invention can be applied.

FIG. 1 in the drawing is a schematic side view of a container crane by way of example, with which the system according to the invention can be applied. In FIG. 1, the container crane is indicated by the general reference number 10 and it is of the so-called STS (Ship-to-Shore) crane type, which is arranged on a quay 11 to travel along rails 12. The container crane 10 is arranged to move containers 13 from a container carrier ship 14 on to transportation pallets 15 or other such trailers 17 pulled by a vehicle 16, and the other way round, during the loading and unloading of the carrier ship 14. The container crane 10 has a vertical body, which comprises legs 18, 19 and which supports a horizontal beam 20, along which a lift bogie 21 is adapted to travel. Through lift ropes 22 the lift bogie 21 carries a container spreader 23, which is used to grip a container 13 from the top. The operator's cabin is connected to the lift bogie 21 and it is indicated by reference number 24, and the crane's electrically operated power machine is indicated by reference number 25. Under the crane there are traffic lanes 26, along which vehicle-trailer-combinations drive under the crane in order to transfer containers 13 from the trailer into the container carrier ship 14, or the other way round.

Figure 2:
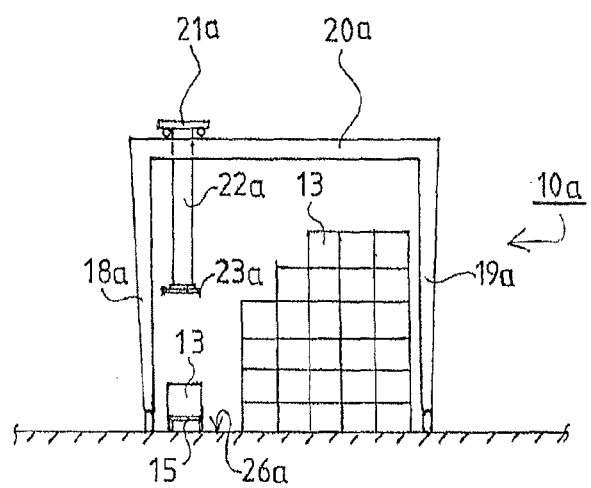
FIG. 2 is a schematic view of a gantry crane, which is used in a container freight terminal and in which the system according to the invention can also be applied.

FIG. 2 is a schematic view of a gantry crane 10a, which is used in a container freight terminal and with which the system according to the invention can also be applied. The gantry crane 10a can be a gantry crane travelling on rails (RMG, Rail Mounted Gantry Crane) or, as is shown in FIG. 2, a rubber tyred gantry crane (RTG, Rubber Tyred Gantry Crane). The gantry crane 10a is intended for transferring containers 13 from transportation pallets 15 or other such trailers pulled by a vehicle and to stack the containers 13 in container rows located in a container field, and the other way round. The gantry crane 10a has a vertical body, which comprises legs 18a, 19a and which supports a horizontal bridge 20a, along which a lift bogie 21a is adapted to travel. Through lift ropes 22a the lift bogie 21a carries a container spreader 23a, which is used to grip the container 13 from the top. The container rows remain in between the gantry crane's 10a legs 18a, 19a, and in between the legs there is also a traffic lane 26a, along which vehicle-trailer-combinations drive under the crane in order to transfer containers 13 from the trailer into container rows, or the other way round.

Figure 3:
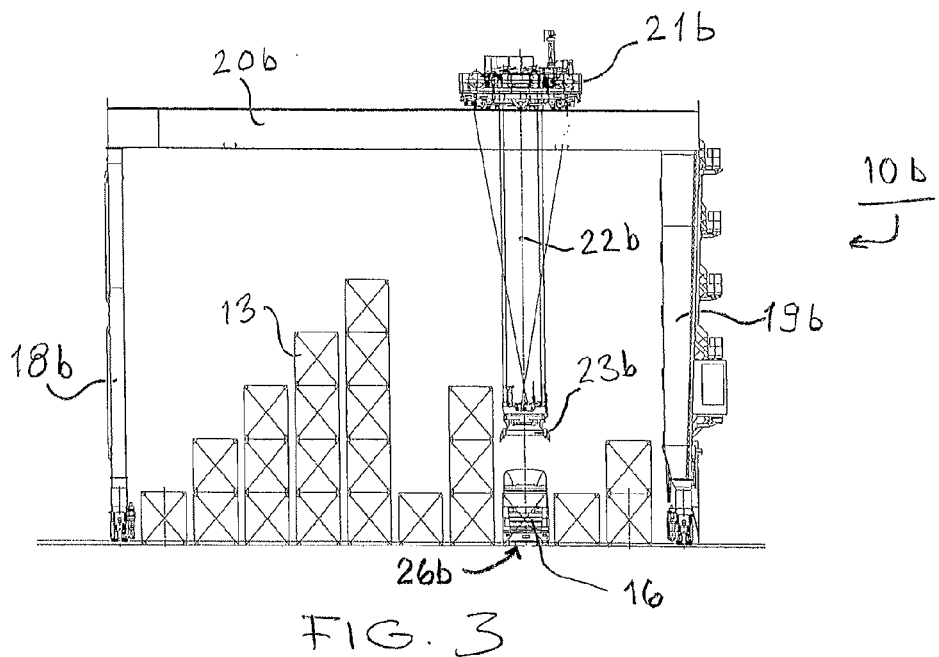
FIG. 3 is a schematic view seen from the front, that is, from the direction of arrival of vehicles, of a stacking crane, which is used in a container freight terminal and in which the system according to the invention can be applied.
Figure 4:
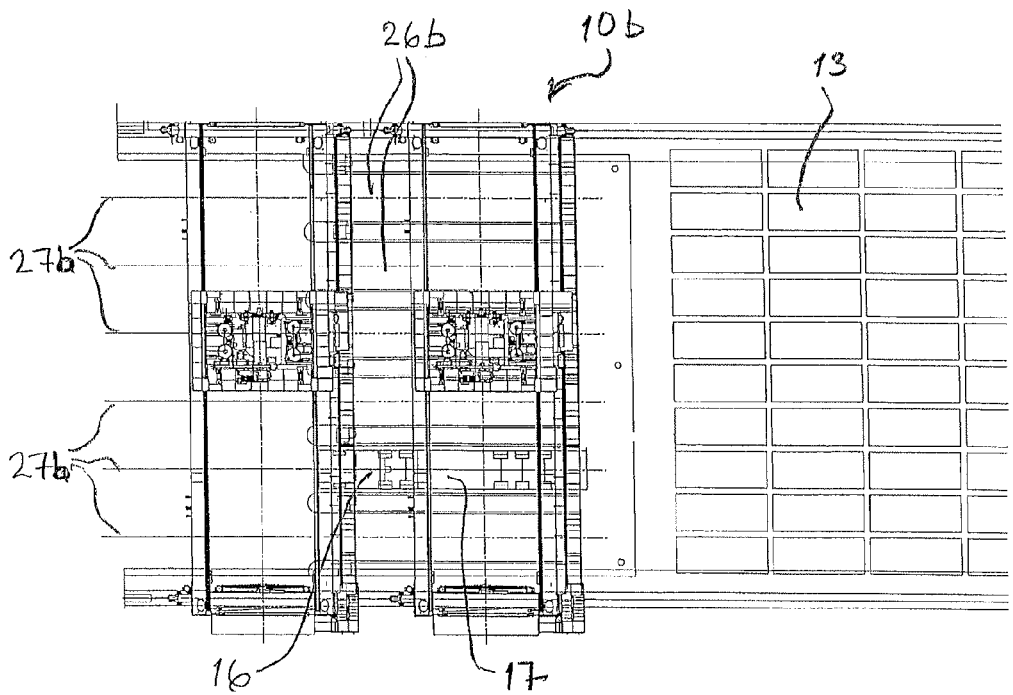
FIG. 4 is similar to FIG. 3 seen from above.

FIGS. 3 and 4 are schematic views of an automatic stacking crane 10b (ASC, Automatic Stacking Crane), which is used in a container freight terminal and with which the system according to the invention can also be applied. The automatic stacking crane 10b has a structure resembling that of the gantry crane 10a shown in FIG. 2 and it is intended in a similar way to transfer containers 13 from vehicles 16 and from trailers 17 pulled by these and to stack the containers 13 in container rows located in a container field, and the other way round. The crane 10b according to FIGS. 3 and 4 is designed to work automatically, that is, without an operator. Thus, the structure of the automatic stacking crane 10b is largely similar to that of the gantry crane 10a of FIG. 2, and thus it is equipped with a vertical body, which comprises legs 18b, 19b and which carries a horizontal bridge 20b, along which a lift bogie 21b is adapted to travel. Through lift ropes 22b the lift bogie 21b carries a container spreader 23b, which is used for gripping the container 13 from above. The automatic stacking crane 10b of FIGS. 3 and 4 operates, for example, in a container freight terminal or, correspondingly, in a port in a container interchange area (LS, Landside interchange area), where traffic lanes 26b are arranged for vehicles 16 and their trailers 17. This area comprising traffic lanes 12b functions as a loading area, in the case of FIGS. 3 and 4 especially as an automated loading area, where loading and unloading of the containers take place. The rows formed by containers 13 as well as the traffic lanes 26b remain in between the crane's 10b legs 18b, 19b. In the case of FIGS. 3 and 4 there are 6 traffic lanes 26b and their middle lines are indicated by reference mark 27b.

The loading of containers 13 into a vehicle 16 and/or its trailer 17 is done in such a way that the vehicle 16 and its trailer 17 are first reversed into a vacant traffic lane 26b and are parked there. The driver of vehicle 16 then prepares the vehicle 16 and/or its trailer 17 for loading by lifting up and in sight the container's locking pins 1, whereupon he/she leaves the automated loading area. For loading, there should preferably be 2-4 locking pins 1 in sight for each container 13, for the loading to succeed. In one container 13 there are always four pin holes, but all four pins need not hereby be in sight for the loading. When the operator has left the loading area for a safe area, crane 10b automatically performs the loading of vehicle 16 and/or trailer. Similarly, in an unloading situation of the load the crane 10b moves the container/containers 13 away from the vehicle and/or trailer after the locking pins 1 have been opened and the operator has left the loading area for a safe area.

Figure 5:
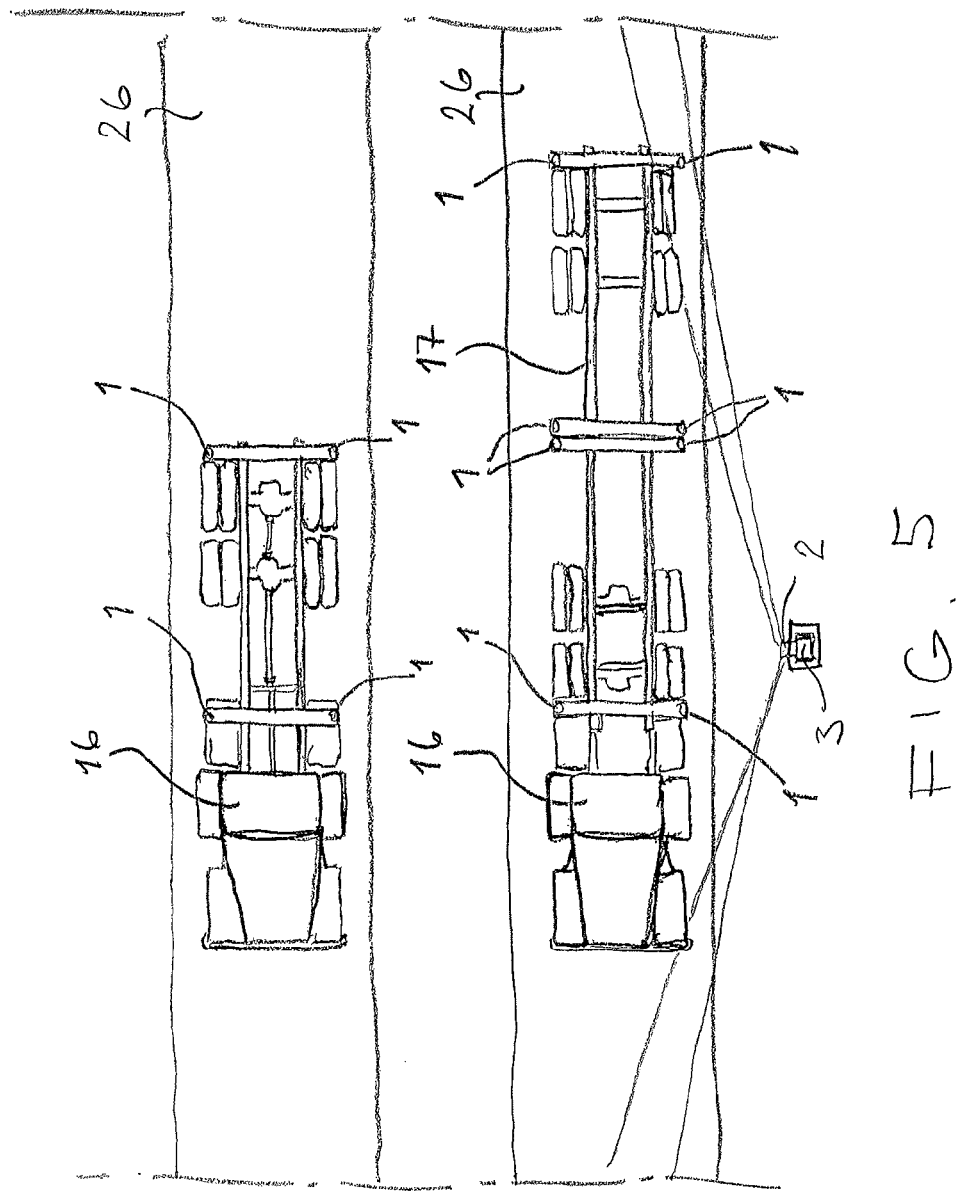
FIG. 5 is a schematic view from above of a vehicle and a combination of a vehicle and a trailer in two parallel traffic lanes.
Figure 6:
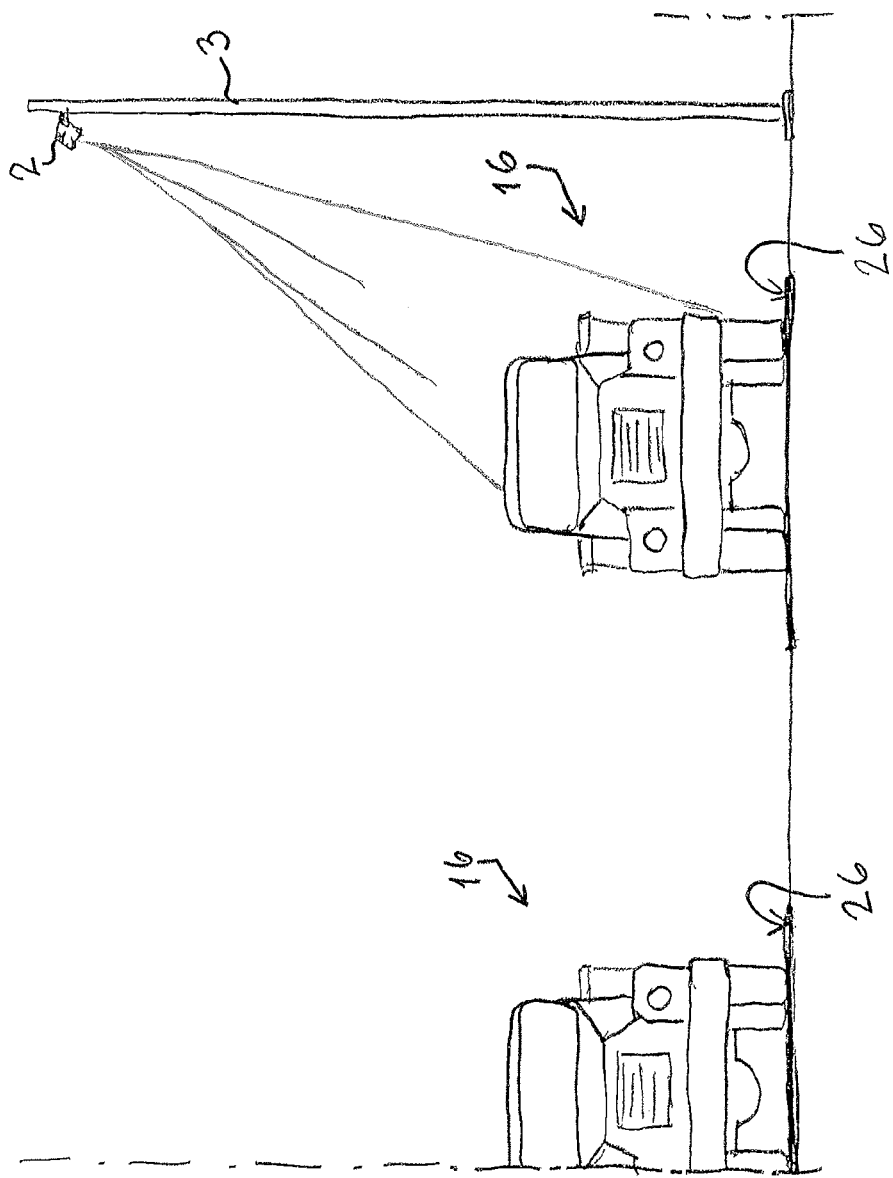
FIG. 6 is similar to the view in FIG. 5 seen from the direction of arrival of vehicles.

FIGS. 5 and 6 thus are schematic views of a vehicle 16 and a combined vehicle 16 and trailer 17 located on two parallel traffic lanes 26. In the view shown in FIGS. 5 and 6, said vehicle 16 and said combination formed by vehicle 16 and trailer 17 are empty and they have thus been driven on to the traffic lanes 26 to be loaded. Containers 13 are loaded into the vehicle 16 and into the combination formed by vehicle 16 and trailer 17, and, correspondingly, in an unloading situation they are unloaded by a container crane 10 travelling above the traffic lanes 26, a gantry crane 10a or, correspondingly, by an automatically stacking crane 10b, which has a container spreader 23, 23a, 23b gripping the containers 13 from above. The vehicle 16 and similarly its trailer 17 have locking pins 1, which lock into pin holes in the corners of the container 13. The container crane 10, gantry crane 10a or correspondingly the automatically stacking crane 10b are provided with a positioning system, which senses the crane's position in relation to the coordinate system of the container field and, on the other hand, the position of the container spreader 23, 23a, 23b in relation to the crane.

The system according to the invention for determination of a container's position in a vehicle 16 to be loaded with containers and/or in its trailer 17 is equipped with laser scanners for determination of the position of locking pins 1 in the vehicle 16 and/or in its trailer 17 and for determination of the container's position depending on these. In FIGS. 5 and 6 the laser scanner is indicated by reference number 2 and in the presentation in the figures it is placed into a fixed structure located in the loading area, as in a column 3 as shown in FIGS. 5 and 6. When the laser scanner 2 is located in a fixed structure, its position in relation to the ground and to the coordinate system of the container field is known and it is always known exactly. In the loading area there may also be several laser scanners 2, especially in a case where there are several traffic lanes 26 in parallel. Each traffic lane may then have its own scanner or, correspondingly, in certain cases the arrangement may be such that one laser scanner attends to 1-4 traffic lanes 26. The laser scanners 2 are arranged to determine the positions in relation to the ground of the locking pins 1 in a vehicle 16 and in its trailer 17 parked in the traffic lane 26. In accordance with the invention, the system relays the position information determined by laser scanners 2 to the cranes 10, 10a, 10b, and based on the crane's 10, 10a, 10b and the container spreader's 23, 23a, 23b position information the crane's positioning system calculates the position of the locking pins 1 in relation to the crane 10, 10a, 10b. With the system according to the invention a considerably higher accuracy is achieved than with the solutions of prior art and, besides, the system according to the invention is essentially more reliable than, for example, camera-based systems.

The invention was described above by way of example by referring to the figures in the enclosed drawing. However, the invention is not intended only to concern the examples shown in the figures, but different embodiments of the invention may vary within the scope of the inventive idea defined in the appended claims.

The invention claimed is:

1. A system for determination of of at least one of a container in a vehicle or a trailer to be loaded with containers in a loading area for containers, where a container or containers are loaded into at least one of a vehicle or a trailer and, correspondingly, containers are unloaded from the at least of a vehicle or a trainer by a crane that handles containers and travels in the loading area above at least one traffic lane, and that comprises a container spreader gripping the containers from above and with a positioning system for the crane and the container spreader, whereby the vehicle and the trailer comprise locking pins locking into pin holes in the corners of the container, whereby the system comprises at least one laser scanner configured to determine a position of the locking pins in at least one of the vehicle or trailer and for determination of the position of the container depending on the position of the locking pins, wherein the at least one laser scanner is installed in loading area into a fixed structure and the at least one laser scanner is arranged to determine positions in relation to the ground of the locking pins in at least one of the vehicle or the trailer parked in the loading area, and wherein the system is arranged to relay the position information determined by the laser scanner to the crane, whereby based on the position information of the crane and the container spreader, the positioning system of the crane is adapted to calculate the position of the locking pins in relation to the crane.

2. The system according to claim 1, wherein the at least one laser scanner is installed beside the at least one traffic lane.

3. The system according to claim 1, wherein each traffic lane has an associated own laser scanner, so that said own laser scanner is arranged to determine the positions of the locking pins in at least one of the vehicle or the trailer parked in the traffic lane.

4. The system according to claim 1, wherein one laser scanner is arranged to determine the positions of locking pins in at least one of 1-4 vehicles or trailers of 1-4 vehicles parked in the traffic lane.

5. The system according to claim 1, wherein for loading at least one of each vehicle or the trailer of each vehicle with a at least one container at least two locking pins are turned to be in sight in at least one of the vehicle or the trailer of the vehicle for each container to be loaded.

* * * * *